United States Patent [19]

Corke et al.

[11] Patent Number: 5,510,917
[45] Date of Patent: Apr. 23, 1996

[54] OPTICAL COMMUNICATION MONITORING AND CONTROL

[75] Inventors: Michael Corke, Mendon; Dean A. Werthman, Uxbridge; Robin M. Moran, Framingham; David W. Stowe, Medfield, all of Mass.; Neville J. Ronan, Killaloe, Ireland; Amy R. Beaudet, Manchaug, Mass.

[73] Assignee: Aster Products, Hopkinton, Mass.

[21] Appl. No.: 417,461

[22] Filed: Apr. 4, 1995

Related U.S. Application Data

[63] Continuation of Ser. No. 672,083, Mar. 19, 1991, abandoned.

[30] Foreign Application Priority Data

Dec. 18, 1990 [IE] Ireland ................................. 4566/90

[51] Int. Cl.$^6$ .......................... H04B 10/08; H04J 14/02
[52] U.S. Cl. .......................... 359/110; 359/125; 359/115
[58] Field of Search ............................ 359/110, 117, 359/118, 124, 166, 174, 176, 177, 115

[56] References Cited

U.S. PATENT DOCUMENTS

| | | | |
|---|---|---|---|
| 4,039,947 | 8/1977 | Miedema | 325/2 |
| 4,435,849 | 3/1984 | Ilgner et al. | 359/177 |
| 4,449,247 | 5/1984 | Waschka, Jr. | 359/177 |
| 4,451,916 | 5/1984 | Casper | 359/165 |
| 4,477,895 | 10/1984 | Casper et al. | 370/16 |
| 4,708,422 | 11/1987 | Arnoux et al. | 359/124 |
| 4,911,515 | 3/1990 | So et al. | 350/96.16 |
| 5,069,521 | 12/1991 | Hardwick | 359/164 |
| 5,077,729 | 12/1991 | Wong | 359/110 |

FOREIGN PATENT DOCUMENTS 0001632  1/1990  Japan ................................. 359/110

OTHER PUBLICATIONS

Aster Corporation commercial literature.
D. Werthman et al., "Route protection scheme for redundancy in fiber communication systems", SPIE conference on Fiber Optic Telecommunications, Boston, Sep. 1989.

*Primary Examiner*—Leo Boudreau
*Assistant Examiner*—Rafael Bacares
*Attorney, Agent, or Firm*—Hoffmann & Baron

[57] ABSTRACT

For communicating over optical routes, route monitoring and protection are provided. In routes carrying signals on each of a number of wave lengths a tapped fraction of the signal is demultiplexed and an individual wave length is detected for determining performance and for triggering switching to alternative monitored routes carrying the same signal. Switching of all wave lengths if one shows faulty, with either a single wave length or all wave lengths being monitored is shown. Performance of a long wave length component is employed to determine route quality for shorter wave lengths as well. In bi-directional communication systems, performance of a wave length moving in one direction through a route determines route quality for transmission in the other direction, as well. Progressive sampling and digitization of the tapped signal and comparison to a digitized reference enables high sensitivity of monitoring. Detected average intensity of a tapped wave length, detected error rate in tapped wave lengths and use of performance data fed back from the receiver telecommunication equipment are used to control switching from one monitored route to another. In a unidirectional system, a wideband coupler at the transmitter is used both to merge signals at various wave lengths and to distribute energy at each of the wave lengths to each route.

25 Claims, 9 Drawing Sheets

OPTICAL COMMUNICATION MONITORING AND CONTROL

CROSS REFERENCE TO RELATED APPLICATIONS

This is a continuation of application Ser. No. 07/672,083 filed on Mar. 19, 1991 now abandoned.

BACKGROUND OF THE INVENTION

The present invention relates to optical communication monitoring and to a control device for connection with optical fibres. At present, if an optic fibre for communication is severed or damaged, it is necessary to divert all signals which would be transmitted on that optic fibre to another optic fibre. Generally, redundant optic fibre are provided for this purpose in communication systems. This is a time-consuming exercise and in many cases results in loss of a significant amount of information and, in the case of telephone companies, a significant loss of revenue.

The present invention is directed towards providing an optical communication monitoring and control device to overcome these problems.

The invention has application to routes over which signals representing high data rates are transmitted, to routes over which a number of wave lengths may be employed and to routes and other systems that must meet defined performance criteria. In such contexts the invention enables monitoring of performance to exacting standards and automatic high speed response if performance falls below selected performance criteria.

SUMMARY OF THE INVENTION

According to one aspect of the invention an optical communication control device is provided comprising a control circuit, an optic signal receiver, a port for connection with at least one primary optic fibre and at least one secondary optic fibre, each optic fibre being for carrying one or more signals; means for tapping a portion of signals from each optic fibre to a signal intensity detector connected to the control circuit; a switch means connected to the control circuit comprising means for automatically directing an optic signal from an optic fibre to the signal receiver according to detected intensity of the received signals, said detected intensity indicating quality of the optic fibres. In one embodiment of the invention, the optic fibres carry multiplexed signals as provided by an optical wave division multiplexer (WDM) and the device comprises a WDM demultiplexer connected between the tapping means and an intensity detector for each demultiplexed signal to detect intensity thereof, the device further comprising a demultiplexer connected between the switch means and a signal receiver for each demultiplexed signal.

In another embodiment, the device further comprises a signal transmitter connected to the switch means via a coupler to facilitate bi-directional use of the device.

In one embodiment of the invention, the switch means is controlled to direct an optic signal from the primary optic fibre unless a fault is detected in the primary optic fibre.

According to another aspect of the invention, there is provided an optical communications system comprising a device as hereinbefore described for connection via primary and secondary optic fibres to a transmit station comprising a coupler for transmission of signals on both the primary and secondary optic fibres.

According to another aspect of the invention, an optical monitoring system is provided for an optical communication route over which at least one set of signals of at least two wave lengths are simultaneously transmitted, comprising: means for tapping a portion of signal from the route, a demultiplexer for demultiplexing the tapped signal into constituent wave lengths of the set, a detector for a selected single demultiplexed optical wave length for detecting the performance quality thereof, the detected value representing the status of the route for that wave length, means for comparing the performance quality of the detected signal to a standard representing the lower limit of acceptable performance quality for that wave length on the route, and means automatically responsive to the comparison to signal an unacceptable status condition of the route.

Preferred embodiments of this aspect of the invention have one or more of the features described in the paragraphs below.

There is a detector for each single demultiplexed optical wave length of the set produced by the demultiplexer, means for comparing the performance quality of the detected signal at each wave length to a respective standard representing the lower limit of acceptable performance at that wave length, and means automatically responsive to the comparison to signal the unacceptable status of the route at least for the respective wave length.

The system is combined with a switch means for switching to a second route at least the signal at the wave length whose performance quality has been determined to be below the acceptable standard.

The switch is arranged to switch signals at all wave lengths in the set of wave lengths on the route to the second route upon the comparison indicating unacceptable status with respect to one wave length in the set of wave lengths.

Only a single wave length selected from the set of wave lengths transmitted along the route is monitored for operation of the switch, the wave length being the wave length in the set most likely to be disturbed along the route, preferably, where the route is defined by optical fibre in a cable, the selected wave length is the longest wave length in the set being transmitted over the optical fibre.

The switch is arranged to switch signals at all wave lengths of a set on the route to another route upon the comparison of any of the wave lengths in the set indicating unacceptable quality of transmission at the wave length.

The detector is selected to detect the average intensity of the signal at the selected wave length for comparison with a threshold value of the minimum signal intensity acceptable.

For use where the signal over the route comprises an encoded digital signal which includes message bits and parity check bits, the detector comprises means for comparing the message bits with the parity check bits and repeatedly determining the present error rate being experienced in signals at the selected wave length, and a function of the experienced error rate is compared with a standard representing the maximum error performance acceptable.

The means for comparing the performance quality at the selected wave length comprises means for periodically sampling the signal at the wave length and repeatedly producing a digital performance value representing the current performance quality at the selected wave length, means for selectively registering a digital reference value as a selected threshold value representing minimal acceptable performance and digital comparison means for repeatedly comparing a function of the digital performance values with the threshold value.

A system in which signals are transmitted bidirectionally over the route is constructed to detect and compare with a standard, the performance quality of at least one selected single wave length travelling in only one direction, the comparison serving to monitor the quality for transmission at the wave length in both directions along the route.

For use with a plurality of routes over which the same signals are simultaneously transmitted at each of a plurality of wave lengths, a system is constructed to detect and compare with a respective standard on a continuous basis the performance quality of at least one selected single wave length travelling in each of the routes and to signal an unacceptable status condition of the respective routes. For automatic route protection, such a system includes control means for switching the route being utilized, for connection from a first route to a second route when the first but not the second route is determined to be below the acceptable standard.

In a system in which signals are transmitted bidirectionally over each of the routes, the system is constructed to detect and compare with the respective standard the performance quality of at least one selected single wave length travelling in only one direction in each of the routes, the comparison serving to monitor the quality for transmission in both directions. In one preferred form, the system is constructed to detect and compare the performance quality of each wave length in a set of wave lengths travelling in one direction along the route, the comparison serving to monitor the quality for transmission at each of the wave lengths in both directions along the route.

For use with receiving telecommunications equipment which monitors the accuracy of communication of signals at each wave length, a switch means is constructed to switch to another route in response to deficient communication as determined and fed back by the receiving telecommunications equipment.

System are constructed to monitor a plurality of bidirectional optical communication routes over each of which signals of at least two wave lengths are simultaneously transmitted, and while a receiver receives its respective wave length from only one of the routes, the monitoring system is constructed to indicate the status of each route in respect of the performance quality at least meeting the lower limit of acceptable performance on the route, to enable switching of the respective receiver to the route of better quality. In a preferred embodiment, this feature is provided in combination with receiving telecommunication equipment which monitors the accuracy of communication of signals at each wave length and switch means constructed to switch to another route in response to deficient communication as determined by the receiving telecommunications equipment and fed back to the switch means.

According to another aspect of the invention, a unidirectional, route-protected optical communication system is provided over which at least one set of signals of at least two wave lengths are simultaneously transmitted, comprising at least two transmitters at respective wave lengths at one end of the system, a plurality of optical routes and receivers at the other end of the routes corresponding to the transmitters, a wideband coupler at the transmit end receiving as separate optical inputs the respective outputs of the transmitters, the coupler serving to merge the energy of the wave lengths from the transmitters, and the coupler connected to distribute energy at each of the wave lengths to each of the routes, and at the output of the routes, a control system including wave division multiplexer means, switch means and monitoring means for monitoring the performance quality of the routes, selecting a route for each wave length and demultiplexing the wave lengths and applying the wave lengths to the respective receivers. In one embodiment of this aspect of the invention, the monitoring means comprises means for tapping a portion of signal from each route, demultiplexing the portion and detecting at least one of its demultiplexed wave lengths to determine the status of the route. In another embodiment of this aspect of the invention, the control system includes a switch control device responsive to signals of deficient communication fed back from telecommunication equipment associated with the receiver for at least one of the wave lengths.

According to another aspect of the invention, a route-protected optical communication system is provided over which signals of at least one wave length are transmitted, comprising a transmitter at one end of the system, a plurality of optical routes and a receiver at the other end of the system, a coupler at the transmit end for receiving as input the transmitted optical signal, the coupler connected to distribute signal energy to each of the routes, and at the output of the routes, a control system including a switch means and monitoring means, for monitoring the performance of the routes, selecting a route and applying signal therefrom to the receiver, the control system including a switch control device responsive to signals of deficient communication fed back from telecommunication equipment associated with the receiver for at least one of the wave lengths to switch to another of the routes whose status is indicated to be acceptable by the monitor.

According to another aspect of the invention, an optical monitoring system is provided for an optical communication route in which signals are transmitted bidirectionally over the route, means for tapping from the route a portion of signal travelling in one direction along the route, an optical detector for detecting the performance quality of the signal, the detected value representing the status of the route for that signal, means for comparing the performance quality of the detected signal to a standard representing the lower limit of acceptable performance quality for the signal on the route, and means automatically responsive to the comparison to signal an unacceptable status condition of the route, for transmission in both directions along the route.

In various preferred embodiments of this aspect of the invention, wherein the communication route is constructed to carry a plurality of wave lengths at least in one direction; the communication routes are constructed to carry a plurality of wave lengths in both directions; the longest wave length travelling along a respective route is monitored to determine the status of the route for all wave lengths being transmitted therealong; for use with a plurality of routes over which the same signals are simultaneously transmitted bidirectionally, the system is constructed to detect and compare with a respective standard, the performance quality of a signal travelling in one direction in each of the routes, and based on the comparison to signal unacceptable status condition for bidirectional communication over the respective routes; the system is combined with a switch means for switching to a second route the bidirectional transmissions when the status condition of the first route has been determined to be below the acceptable standard; and the monitoring system is combined with a plurality of bidirectional routes to provide a route-protected communication system.

In other embodiments, novel features mentioned above for routes carrying multiple wave lengths are employed to advantage to protect routes carrying single wave lengths or systems in which means of detection other than those shown are employed.

DETAILED DESCRIPTION OF THE INVENTION

The invention will be more clearly understood from the following description of some embodiments thereof, given by way of example only with reference to the accompanying drawings in which:

FIGS. 1(a) and 1(b) are schematic representations of an optical communications system incorporating a device of the invention;

Figure 1A:
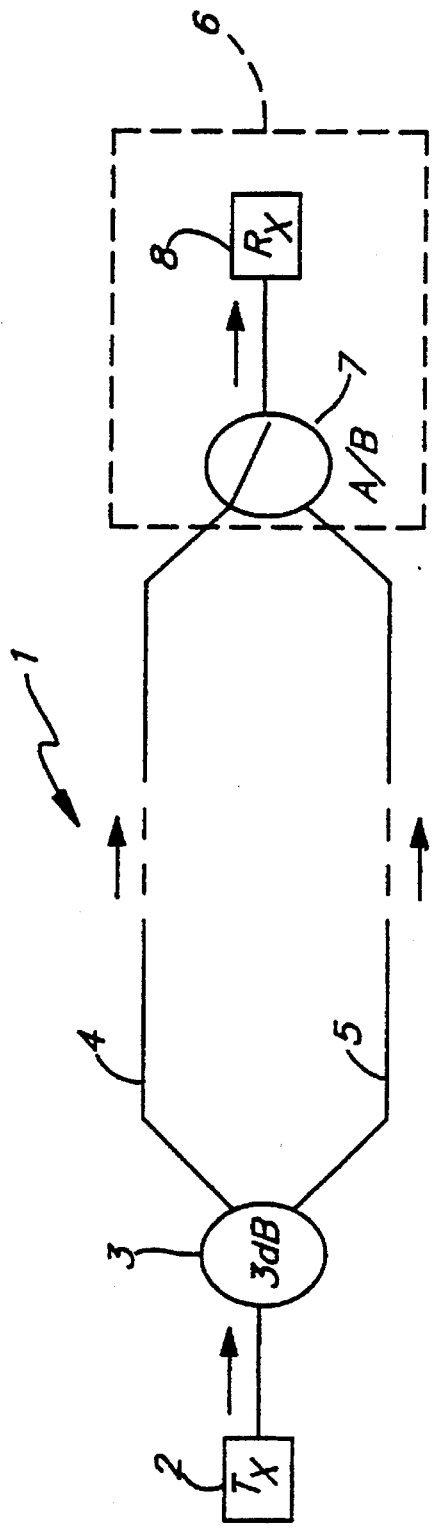
Figure 1B:
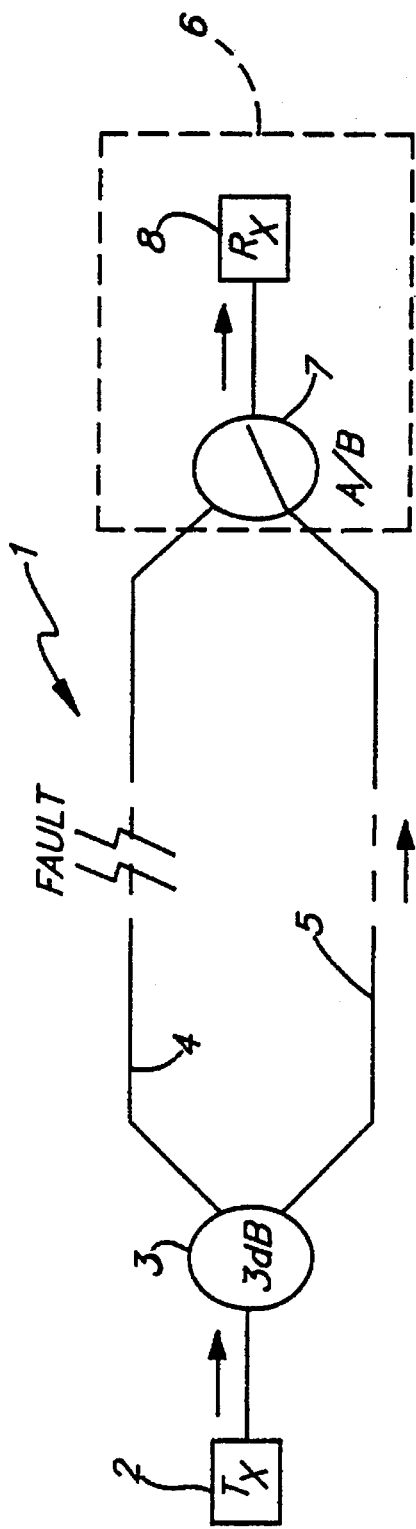

Referring to the drawings, and initially to FIG. 1 there is illustrated an optical communications system 1. The system 1 comprises a signal transmitter unit 2 for directing one or more optic signals to a 3 dB coupler 3 which directs the signals onto two optic fibres. In this embodiment there is a primary optic fibre 4 and a second optic fibre 5. The optic signals are coupled equally onto both optic fibres for full redundancy. At the other end of the communication system 1, the optic fibres 4 and 5 are connected to a communication monitoring and control device 6 of the invention. The control device 6 comprises a switching means 7 which directs signals from one or other of the optic fibres 4 or 5 to a receiver unit 8. This is illustrated schematically as a physical linking of the receiver 8 to either of the optic fibres 4 or 5. In FIG. 1(a) the system 1 is in normal use in which both optic fibres 4 and 5 are operating correctly and the switch means 7 directs signals from the primary optic fibre 4 to the receive unit 8. In FIG. 1(b), however, the primary optic fibre 4 is faulty, in which situation the switch means 7 directs the signals from the secondary optic fibre 5 to the receiver unit 8. This is a simple example of the invention and it will be appreciated that various other arrangements could be used such as for example, use of four primary optic fibres and four secondary optic fibres.

Figure 2:
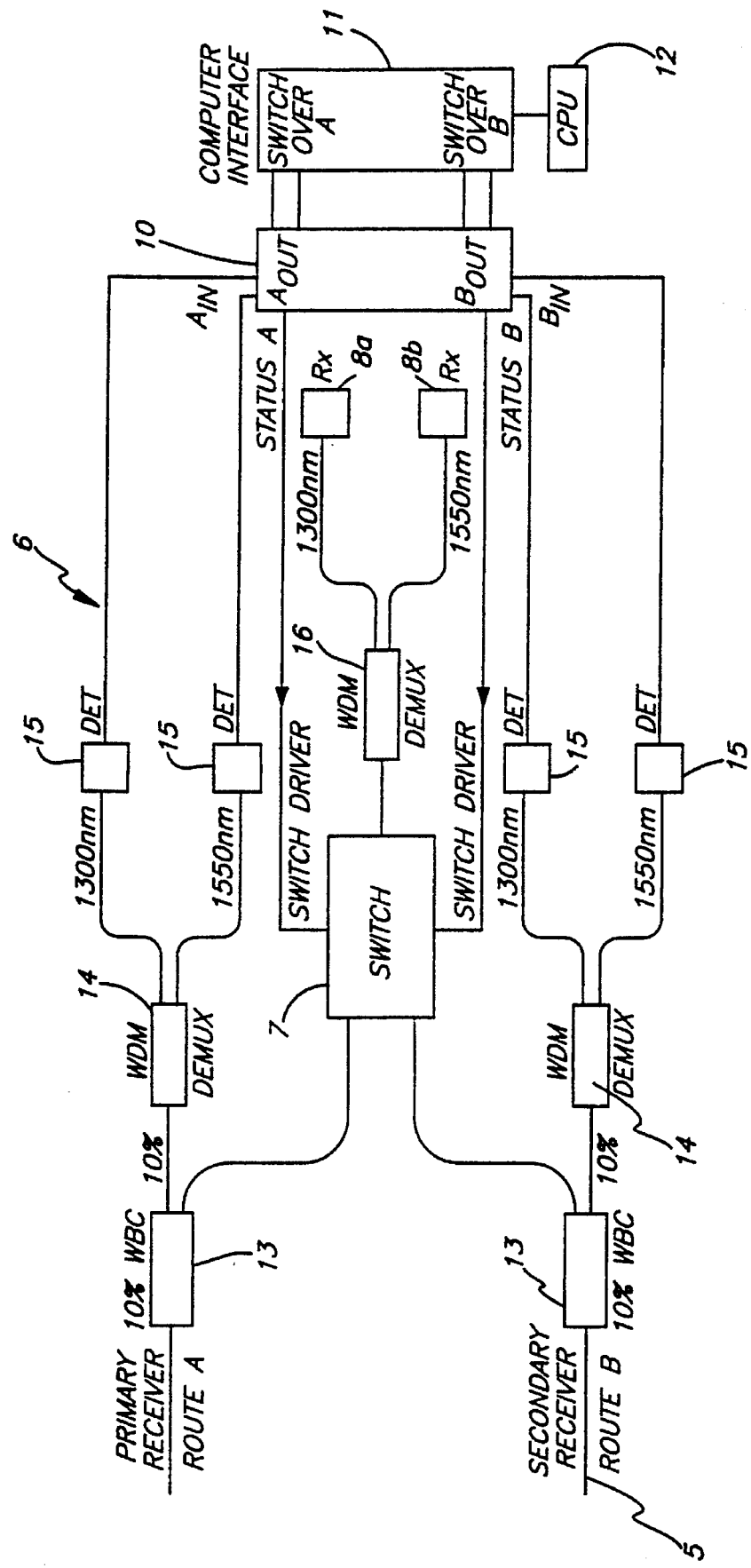
FIG. 2 is a diagram illustrating a logical communication control device of a preferred embodiment of the invention in detail.

Referring now to FIG. 2, a preferred embodiment of the communication monitoring and control device 6 is illustrated in detail. The switch means 7 is a single-pole, double throw optical switch. In this embodiment, the receiver unit 8 comprises two separate receivers, namely, a receiver 8(a) for reception of 1300 nm demultiplexed signals and a receiver 8(b) for reception of 1550 nm demultiplexed signals. The device comprises a control circuit 10 which is connected to a computer interface 11 to allow communication with a CPU 12. The primary and secondary optic fibres 4 and 5 are connected to the device 6 at ports, in this embodiment comprising tap couplers 13 of the 10 percent wide band type. The construction of the device 6 is symmetrical between the two incoming optic fibres and similar parts for use with the primary and secondary optic fibres are denoted by the same reference numerals. Each tap coupler 13, for delivery of 10 percent of the intensity of this incoming signals is connected to a wave division demultiplexer 14 such as are available from Aster Corporation of Milford, Mass. USA and Aster Limited of Limerick, Ireland. Each demultiplexer 14 outputs separate 1300 nm and 1550 nm demultiplexed signals to respective photodetectors 15 connected to the control circuit 10. Ninety percent of the received signals are transmitted from each tap coupler 13 to the input of the switch 7, the output of which is connected to a wave division multiplexer 16 for separation of the 1300 nm and 1550 nm signals to the ports of receivers 8(a) and 8(b).

In use, the tap couplers 13 continuously divert 10 percent of the incoming signals to the detectors 15 via the demultiplexers 14. Accordingly, both the primary and the secondary optic fibres 4 and 5 are continuously monitored at each wave length independently. During normal operation when both optic fibres are in good condition, the control circuit 10 defaults to controlling the switch 7 to direct signals of the primary optic fibre 4 to the ports of receivers 8(a) and 8(b). However, this is not necessarily the case. If a fault occurs in the primary optic fibre 4 at either wave length, this is detected as a drop in intensity at the respective detector 15 connected to the demultiplexer 14 of the primary optic fibre 4. If the intensity drops below a pre-set level which is programmed into the control unit 10, the control unit 10 outputs a signal causing the switch 7 to direct signals from the secondary optic fibre 5 to the ports of receivers 8(a) and 8(b). This happens only if the detectors 15 for the secondary route (route B) detect a sufficiently high signal intensity for each of the two demultiplexed signals.

It will be appreciated that use of a 10 percent tap coupler ensures that sufficient optical power is used in monitoring of the optic fibres while at the same time it has a sufficiently low coupling ratio to limit the impact of the insertion loss of device 6 on this system. The detectors 15 each have an InGaAs PIN photodiode as this gives optimum quantum efficiency in both the 1300 and the 1500 nm wave length windows. Such photodiodes have a high sensitivity and low dark current.

The control circuit 10 includes a two-stage transimpedance amplifier for each photodetector which converts the photodiode DC current to a proportional voltage.

The analogue signals present at the output of the four transimpedance amplifiers are subjected to quantitative digitizing for through put to the system. The purpose of digitizing the signals is two-fold. First, the optical signal is displayed on the module's front face-plate. The power is read-out through a 3-digit LED (light-emitting-diode) display calibrated directly in dBm (decibels, referred to 1.0 milliwatt).

More importantly, to process four discrete linear signals with their analogue-values could be quite expensive, and component inaccuracy would compound error accuracy. The four linearly signals are presented to an analogue multiplexer, and each signal is selected for processing governed by timing logic imbedded within the control circuit. During its respective "process time" an analogue signal from a selected detector is introduced to a 16 bit (resolution) A-D (analogue-to-digital) converter. By employing for the sampling a converter which is capable of resolving to 16 bits, a full 40 dB dynamic range (10 V–1 mV) can be measured. The second purpose for digitizing the signal is therefore simplification of the linear-logarithmic conversion and achieving high accuracy.

After the detector signal has been digitized, a PROM (programmable-read-only-memory) is employed, which carries all look-up tables for any given linear digital code. The PROM is decoded within itself to provide BCD (binary-coded-decimal) outputs which directly drive seven segment displays. Seven segment displays are the choice of read-out employed on the module's front face-plate. Once the signal is processed through the PROM device, comparisons to the signal for determining performance quality are straightforward.

The approach to the detection of a signal monitored to be within a selected range of acceptable operation or to fall out of range is a digital approach. This approach results in an effective human to machine interface, providing to the field engineer (FE) the ability to adjust the setting of the "trip level" reference for the four separate power levels through the front/panel of the module. The "trip level" setting is calibrated directly in dBm (decibels, referred to 1.0 milliwatt).

The level is read out on two separate LED (light-emitting-diode) displays. One display reads the Primary Route "trip level" setting at both 1.3 μm and 1.5 μm. The other display performs the same functions for the Secondary Route channel. The displays have a dynamic range setting of 40.0 dB incremented in 0.1 dB steps. The "trip level" setting is controlled by a two-position up/down push-button switch, one switch is provided for both channels. Because the actual measured power level is a digital expression which is binary-coded decimal, simple BCD digital counters are employed to provide the field adjustable reference.

As mentioned both the optical signal and the trip level setting are encoded as binary-coded decimal digital signals. These signals are presented to digital comparators which determine if the "words" agree (are equal to ), or if the optical power level is less than, or more than, the reference level.

These three comparator "states" are presented to LED's on the front face-plate which allows the FE to determine the present status of the module. If the optical signal level of the 1300 and 1550 detectors for the primary route were to fall to a level which is equal to, or less than the reference trip level, the optical switch will receive a pulse which diverts it from the primary optical port to the secondary optical port, thus providing automatic fibre-route switching. This is permitted to occur only if the status of the secondary port shows an acceptable power level at each wave length.

Figure 3:
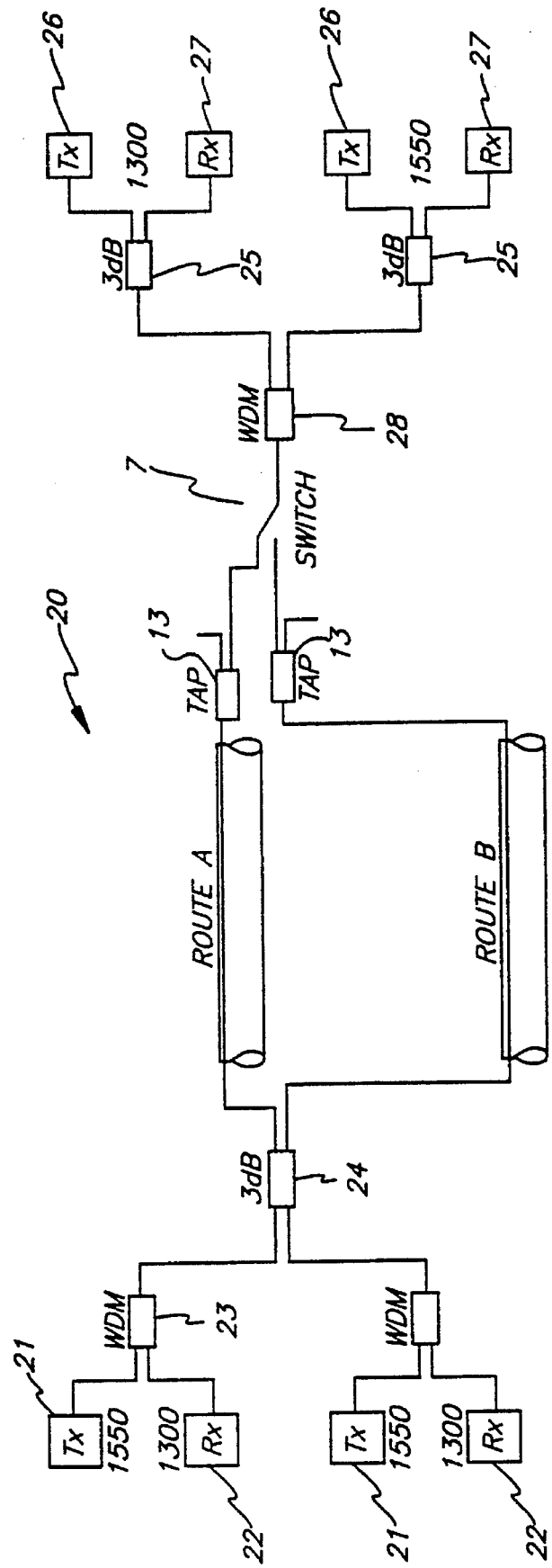
FIG. 3 is a schematic representation of an alternative construction of communications system incorporating devices of the invention.

Referring now to FIG. 3, there is illustrated another embodiment of the invention, indicated generally by the reference numeral 20. Like parts are assigned the same reference numerals. At the "transmitter" end there are both transmit ports 21 and receive ports 22 for each wave length. A wave division multiplexer 23 multiplexes the signals and the two output lines are coupled at a 3 dB coupler 24 to routes A and B. At the "receive" end there is a 3 dB coupler 25 between a multiplexer/demultiplexer 28 and separate transmit and receive ports 26 and 27. Accordingly, use of the few added components allows the system 20 to be used for route-protected bi-directional communication. In other respects, it operates in a manner similar to the system already described.

Figure 4:
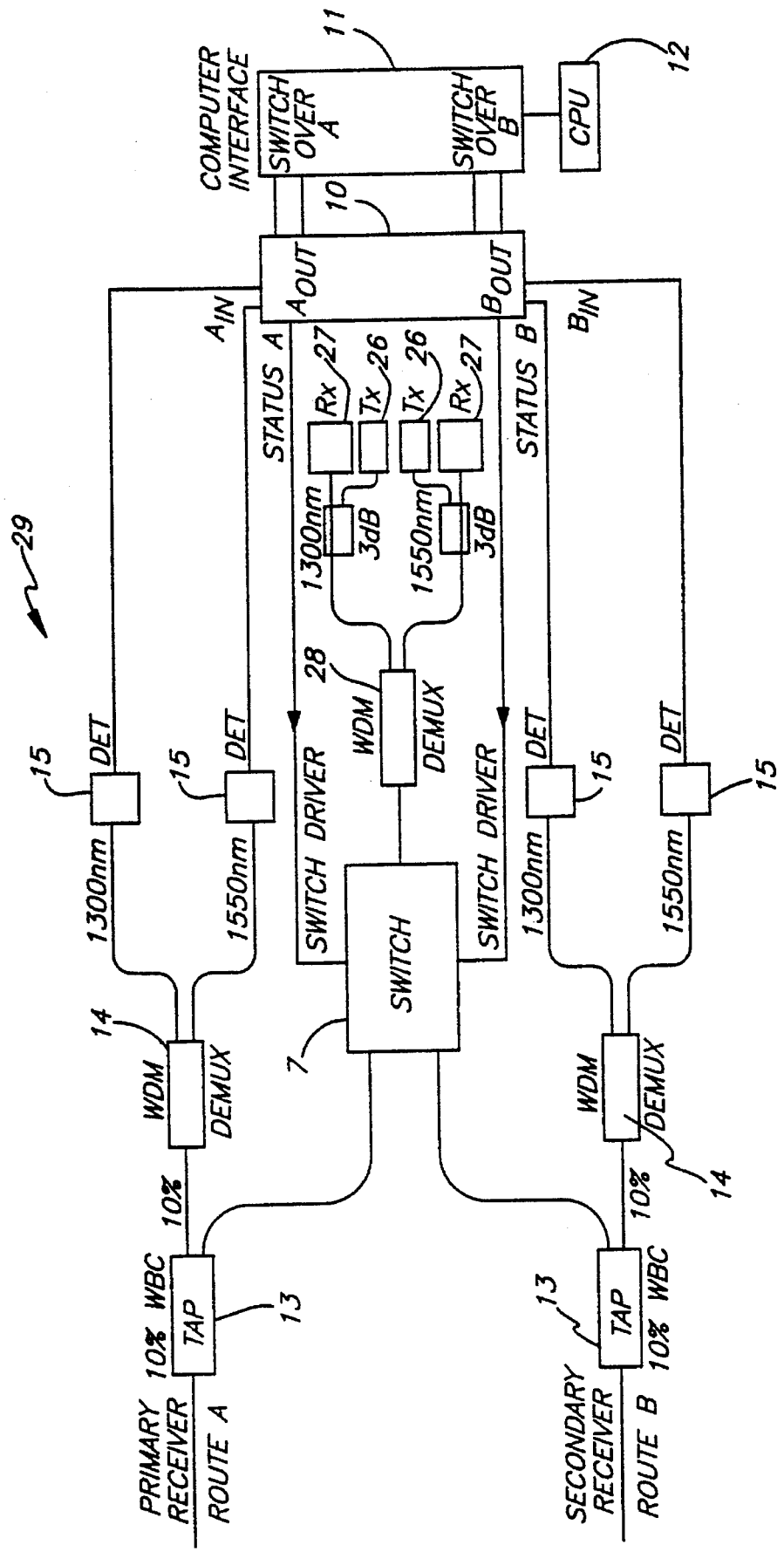
FIG. 4 is a detailed diagram of an alternative construction of the optical communication control device of the invention.

Referring now to FIG. 4, there is illustrated in detail an optical communications control device 29 for use in the system 20. It will be seen that the device 29 is similar to the device 6 with the exception of additional 3 db couplers and except that transmit circuits 26 are included and 3 db couplers are used to allow connection of the transmit circuits 26 to the multiplexer/demultiplexer 28 for bi-directional communication.

Figure 5:
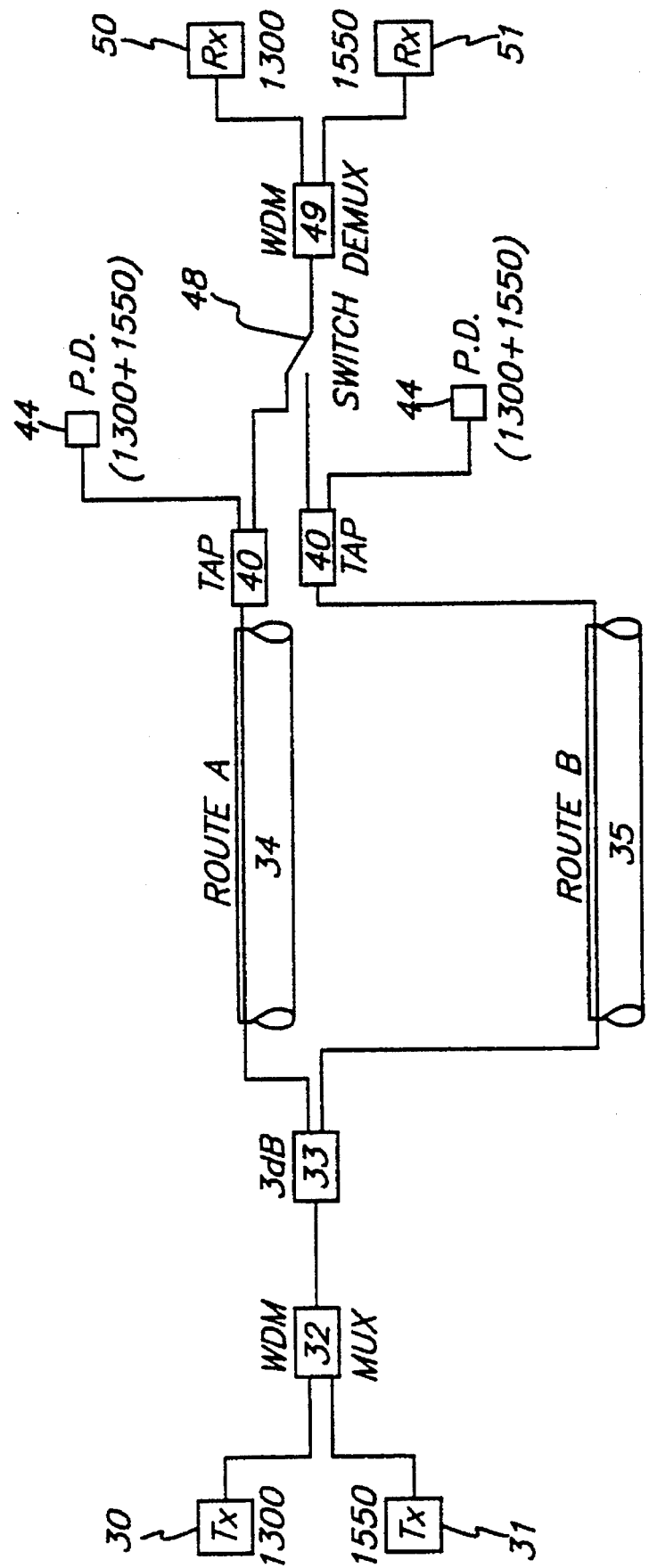
FIG. 5 is a schematic representation of a prior art dual wave length unidirectional fibre route protection system showing the location of WDM multiplexers and demultiplexers.

For the embodiment next to be described, it is useful first to refer to the schematic diagram of FIG. 5 which shows a prior art system in conjunction with 1300/1550 nm unidirectional WDM transmission. The signals from the 1300 and 1550 nm transmitters 30, 31 are multiplexed by the WDM, 32, onto a single fibre and are separated into the two diverse routes (A and B), 34, 34, by the Extended Wideband Coupler (EWBC), 33. The EWBC has a 50 percent coupling ratio in both the 1300 and 1550 nm wave length windows. At the receiver end of the system the monitoring system provides for monitoring of the status of both route A and route B. This is achieved by using a 10 percent EWBC coupler, 40, 41, to tap off 10 percent of both the 1300 and 1550 nm signals on each route. The photodetectors 44 monitor the sum of the 1300 and 1550 signals in routes A and B respectively. Should the combined optical power on route A fall below the predetermined trip value as determined by an analogue threshold detection circuit the switch would be engaged to direct the route B signals to the lightwave receivers, 50 and 51.

According to the present invention, it has been realized that this feature of monitoring the combined optical power (at 1300 and 1550 nm) by a single detector can lead to serious signal failure at one wave length, leading to poor BER performance being undetected. An example of such a scenario would be a so-called "back-hoe" fade which would cause significant loss at 1550 nm as a buried cable was being bent (by inadvertent contact by an earth excavating machine) while minimal effect at 1300 nm would be observed. Also, microbending of the individual fibres inside the cable due to the intrusion and freezing of water inside the jacket could give rise to similar effects. For example, if the 1300 and 1550 nm signals were of equal optical power then the complete loss of the 1550 nm signal on route A would result in the combined optical power level falling by a value of 50 percent (or 3 dB). This would not, under typical operating conditions of a digital data transmissions link, cause the route A monitoring system to switch or alert the switch control system.

As has been described above, according to the present invention, independent monitoring of each wave length in both routes A and B enables the protection system to operate if either of the signals in route A should fall to an unacceptable level. This is accomplished by employing the embodiment shown in FIG. 2, for a general two wave length system.

Figure 6:
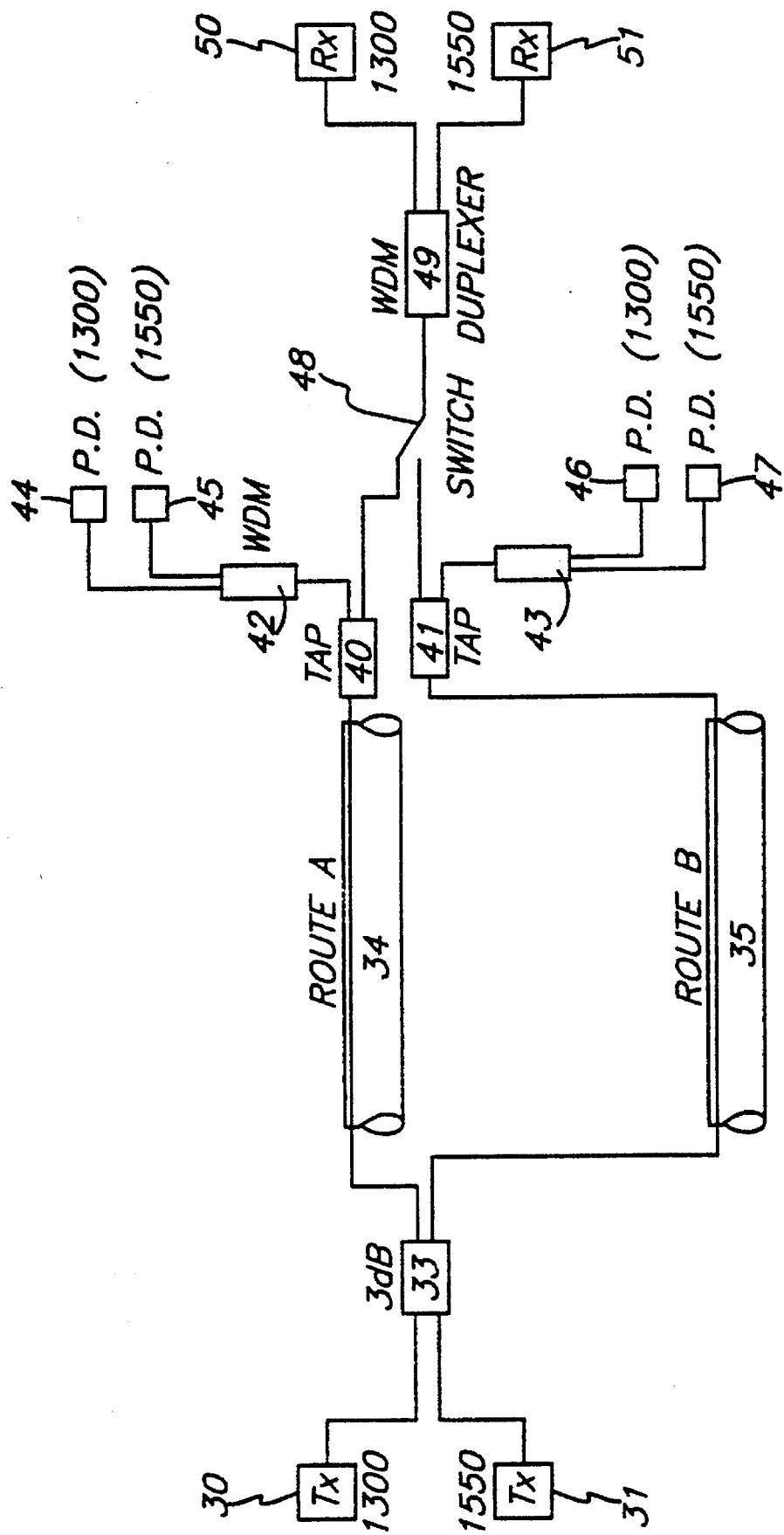
FIG. 6 is a representation of an improved dual wave length unidirectional monitoring system according to the invention.

According to another aspect of the invention, referring to FIG. 6, a unidirectional dual wave system is shown in which the WDM of FIG. 5 is omitted. The extended wideband coupler, 33, is employed both to merge the transmitted signal energy from 1300 and 1550 nm transmitters and to divide the 1300 and 1550 nm signals equally into routes A and B. This system may be employed wherever the geographical location of the transmission equipment with respect to the diversely routed cables makes it appropriate.

The control device of FIG. 2 can again be employed for the embodiment of FIG. 6 to monitor the detectors 44, 45, 46 and 47 and operate switch 48 if either wave length signal in route A falls below specified energy. Alternatively, in a simplified system, the control device of FIG. 2 is modified to monitor only the longer wave length, 1550 nm, and to operate switch 48 if the 1550 nm signal energy route A falls below the specified threshold (assuming the status of route B, as mentioned, is acceptable).

Figure 7:
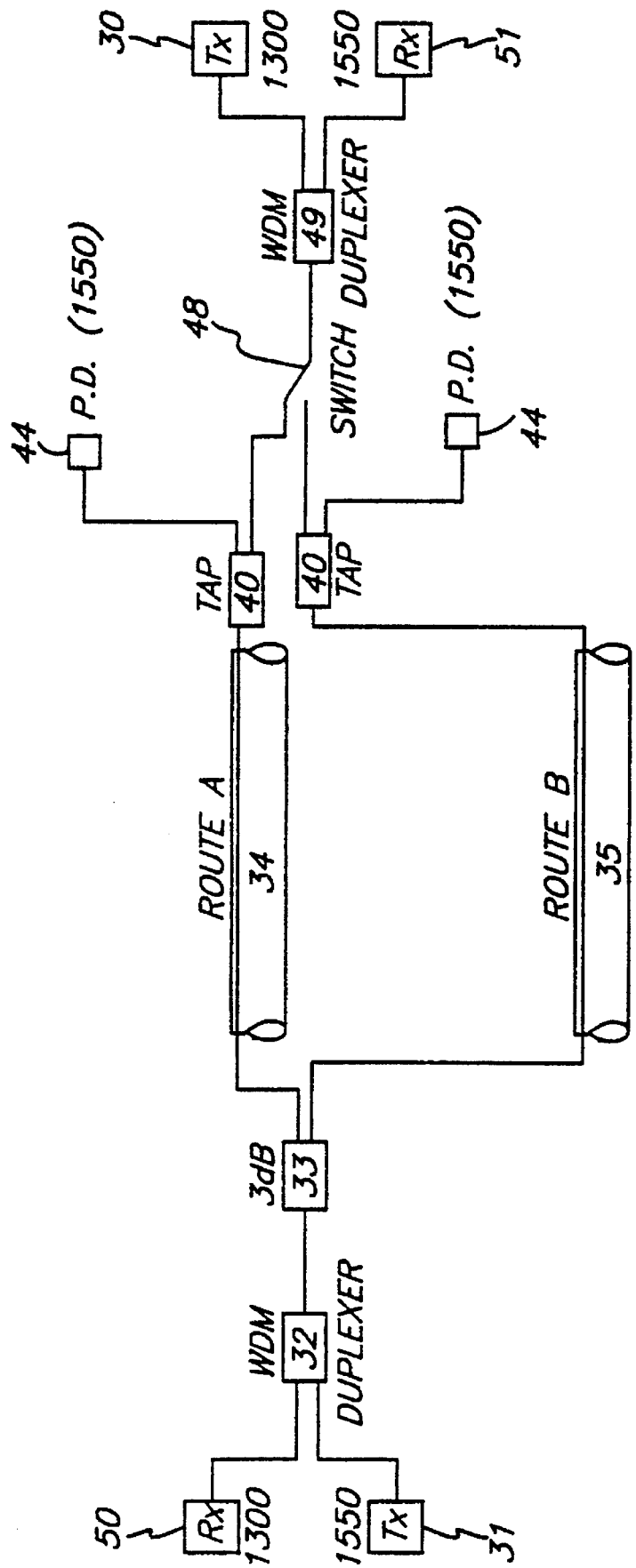
FIG. 7 is a representation of a dual wave length, bidirectional system according to the invention.

Another embodiment, a bidirectional dual wave length system, is shown in FIG. 7, where the switch is located at the receiver side of the 1550 nm signal and monitors only this signal. If the route A cable is disturbed or severed, the 1550 nm monitor system detects that condition and automatically switches to route B. The 1330 nm signal travelling in the opposite direction is also directed on to the route B cable.

In this embodiment and in the alternative simplified system mentioned for FIG. 6, only one detector 44 is used to monitor the primary route and one to monitor the secondary route, resulting in a reduced system cost. In this embodiment it is important that the longer wave length, 1550 nm, signal be the one that is monitored as the longer wave length is more susceptible to bend-induced loss than the shorter wavelength.

Figure 8:
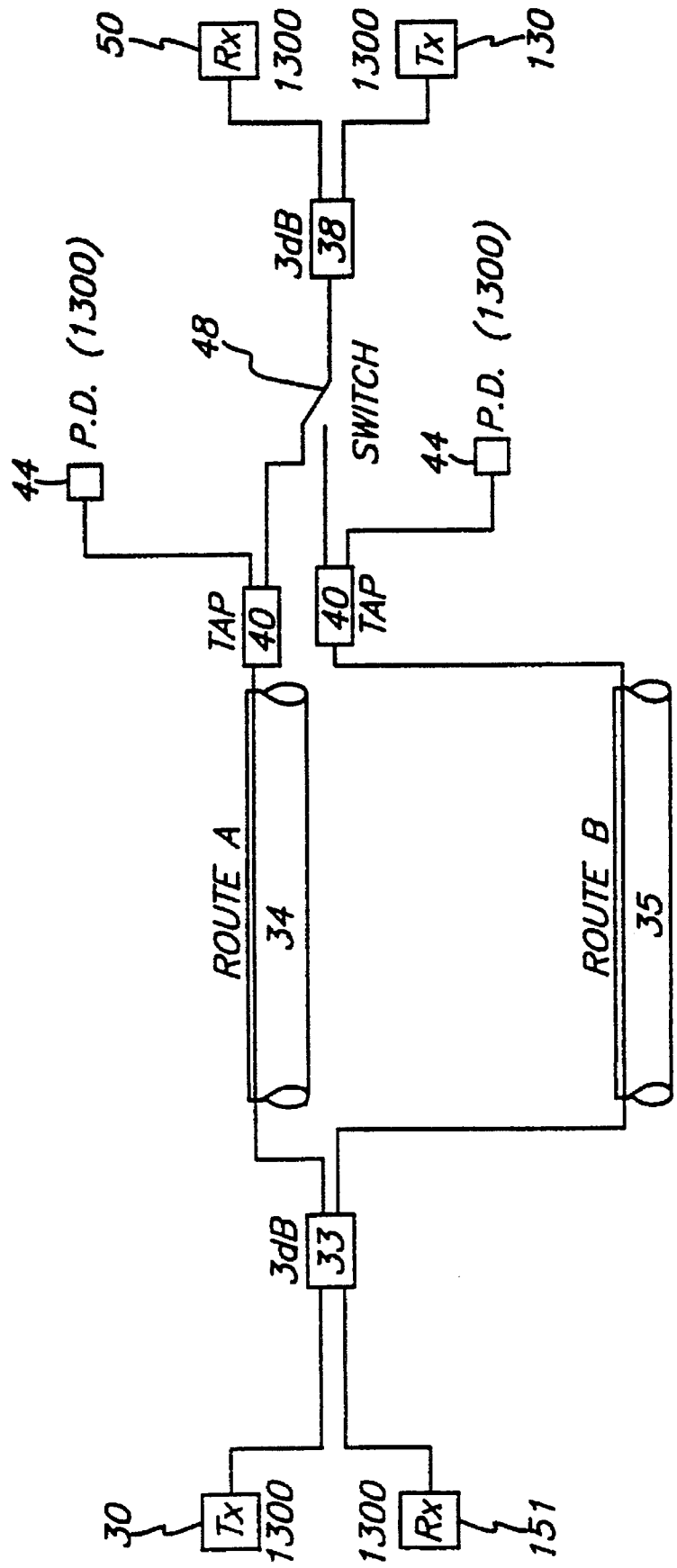
FIG. 8 is a representation of a single wave length bidirectional system according to the invention.

Another embodiment of the invention is shown in FIG. 8 where protection of simultaneous bidirectional signals at the same wave length is shown. In this example 1300 nm signals are used. The signal from the 1300 nm transmitter, 30, is divided by the 3 dB coupler 33 into the primary and secondary routes A and B. The signals in these two routes are monitored by detectors 44 as described previously. On traversing the switch the signal is divided by the 3 dB coupler into the receiver 50. In the opposite direction the signal from the transmitter 130 travels the same path as the signal from transmitter 30 but in the opposite direction. In this embodiment if route A should fail it would be detected by the detector 44, which is monitoring the signals from the transmitter 30. The control device would make the digital comparison, as described above, and upon determining the intensity at the detector has fallen below the specified digital threshold value it would switch the switch to access route B, (assuming that route B monitored status was acceptable). The signal from the transmitter 130 would then automatically be diverted through route B to the receiver 151, while the signal from transmitter 30 is received at receiver 50 through route B.

Figure 9:
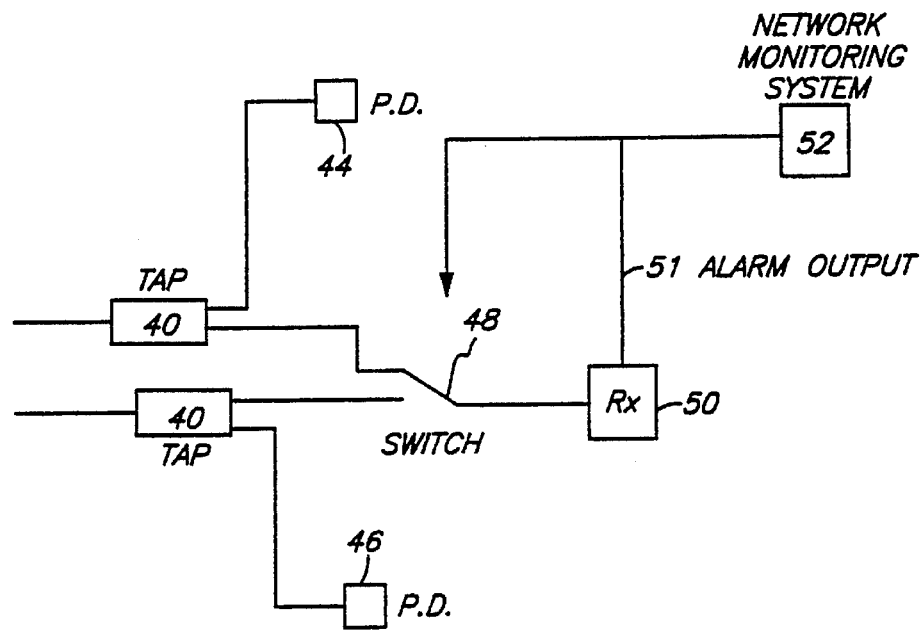
FIG. 9 is a diagram of an alternative construction of the communication control device of the invention.

In another embodiment of this invention, fault signals arising in the receiving telecommunications equipment, such as error bit rate performance, are used to cause the switch to access an alternative path, FIG. 9. In such receiving equipment the quality of the encoded optical signal is ordinarily determined and an alarm is present if the quality falls below a predetermined value. Also, the receiving equipment recognizes certain signal patterns that represent failure states in other segments of the network. All or any of these failure states are represented by alarm outputs from the receiver and can be used to control the switch position, as indicated in FIG. 9.

It remains useful in the embodiment of FIG. 9 to monitor the energy at detectors 44 for routes A and B and in the case of multiple wave length system, to employ a WDM and monitor the energy of at least the longest wave length signal, or preferably at each wave length, and on that basis to permit switching to route B under the control of the receiving equipment only if the detected status for route B is acceptable.

Figure 10:
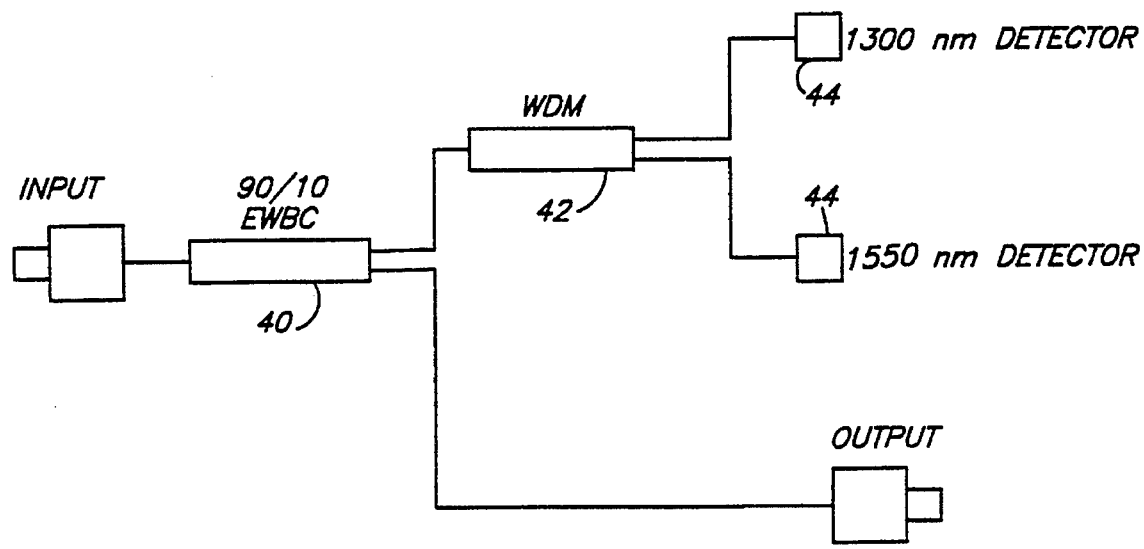
FIG. 10 is a diagram showing a dual wave length monitoring system.

Another embodiment of this invention is a multi wave length monitoring system as shown in FIG. 10. Signals of various wave lengths are tapped off the input fibre by a 10 percent wideband coupler 40. Each of the signals is demultiplexed by the wave length division multiplexer 42 into respective detectors 44. In this example two signals of wave lengths 1300 and 1550 nm are shown. However, the invention is not limited to these two wave lengths, but there can be many, N, signals demultiplexed by a 1×N demultiplexer into N detectors.

The outputs of the respective detectors are digitized and independently compared to their respective reference trip levels. Alarm outputs can be generated if one or more of the detector outputs falls below its respective trip level.

There are many other uses for various aspects of the invention, a few further examples of which will be mentioned. By modifying FIG. 2 by locating the WDM to the left of switch 7, and then to use another switch so that there is a separate switch for each wave length, it becomes possible to select the better route for each wave length independent of the other. Thus monitoring of the 1300 nm signal switch may select route A while monitoring of the 1550 nm signal switch may select route B. Operation of each of the switches may be controlled by the system of FIG. 2 or on the basis of performance monitoring (e.g. bit error rate performance) by the telecommunications equipment, in conjunction with monitoring performed by the respective components of FIG. 2.

The system of FIG. 2 may be modified for digital signal streams that include message bits and parity bits, as follows. Instead of using detectors 15 or 44 to detect available signal intensity, an appropriate bit recognition system can be employed to compare message bits and parity bits, and to generate, e.g., an error rate value which changes with the performance of the route. A function of the detector error rate can then be digitally compared to a selected threshold value, and if exceeded the switch may be operated as described above.

The digital threshold monitoring of energy transmitted down a fibre, as described in relation to FIG. 2 and the variations that have suggested have utility in other monitoring applications both for single and dual wave lengths. The degree of accuracy for the digitized detected signal, e.g., the digitized intensity sample or the digitized error rate permits ready adaption of the equipment to systems have widely different performance specifications. For instance instead of a 6 dB band for permitted performance that may be acceptable for digital transmission over a telephone route, a 2 dB range of variance may be specified for an analogue CATV system. Simple changes of the settings of the trip level reference values may be all that is necessary to change a standard route protection device from one application to another.

Instead of controlling switching of routes as has been described, similar equipment may be employed to deal with sets of wave lengths independently in more complex transmission systems employing for instance 4, 8 or 16 wave lengths. For example, the longest wave length of each set of two or four wave lengths can be used to monitor the quality of the route and switch the entire set to another route if performance specifications are violated. Furthermore, more than two routes may receive the same signals for further redundancy and be monitored. In this case, it will be appreciated that passive optical splitters with the appropriate number of inputs and outputs will be employed, functioning in the same manner for such multiple routes as the two input couplers functioned for the embodiments described above. The same monitoring and control equipment can readily be adapted to protect a route or receiver equipment from excessive optical energy at all or any one wave length. The same monitoring system can also be employed simply to provide performance information to an operator or computerized management system or to automatically control an alarm to trigger a diagnostic sequence. Thus the invention, in addition to its importance to actuating the switching between routes, has other important applications as well.

The invention is not limited to the embodiments hereinbefore described, but may be varied in construction and detail.

We claim:

1. An optical monitoring system for an optical communication route over which at least one set of communication signals of at least two distinct carrier optical wave lengths are simultaneously transmitted, each wave length carrying modulated information, said monitoring system comprising:

means for tapping a portion of said communication signal from the route after the signal has travelled over said route, the remainder of said signal being unaffected and proceeding as an optical signal, a demultiplexer for demultiplexing the tapped portion of said signal into its constituent optical wave lengths, an optical detector for detecting selected single demultiplexed optical wave length for providing a value representing the performance quality of the route for that wave length, evaluation means for comparing said value representing the performance quality to a standard representing the lower limit of acceptable performance quality for said wave length to evaluate the status condition of said route, and signal means automatically responsive to said evaluation means to signal an unacceptable status condition of said route.

2. The optical monitoring system of claim 1 wherein there are multiple said detectors, one said detector for detecting each demultiplexed optical wave length and for providing a value representing the performance quality of the route for that wave length, said evaluation means being adapted for comparing said value representing the performance quality at each wave length to a respective standard representing the lower limit of acceptable performance quality at said wave length, and said signal means being automatically responsive to said evaluation means to signal an unacceptable status condition of said route for the respective wave length.

3. The optical monitoring system of claim 1 in combination with a switch means for switching to a second route at least the signal that comprises the wave length for which an unacceptable status condition has been determined.

4. The optical monitoring system of claim 3 wherein only a single wave length selected from said set of wave lengths that travel over said route is detected and evaluated for operation of said switch, said wave length being selected as the wave length in said set most likely to be disturbed over said route.

5. The optical monitoring system of claim 4 wherein said route is defined by optical fibre in a cable, and said selected wave length is the longest wave length in said set being transmitted over said optical fibre.

6. The optical monitoring system of claim 1 or 3 wherein said detector is selected to detect the average intensity of the optical signal at said selected wave length for providing said value representing the performance quality.

7. The optical monitoring system of claim 1 or 3 for use where said signal over said route comprises an encoded digital signal which includes message bits and parity check bits, said detector comprises means for comparing the message bits with said parity check bits and repeatedly determining the present error rate being experienced in signals at said selected wave length, said experienced error rate providing said value representing the performance quality.

8. The optical monitoring system of claim 1 or 3 wherein said evaluation means comprises means for periodically sampling the signal at said wave length and repeatedly producing said value representing the current performance quality at the selected wave length, means for selectively registering a standard that is a selected threshold value representing minimal acceptable performance quality and comparison means for repeatedly comparing said values representing the performance quality with said threshold values.

9. The optical monitoring system of claim 1 or 3 in which signals are transmitted bidirectionally over said route, said system constructed to detect and compare said standard with said value representing the performance quality of at least one selected single wave length travelling in only one direction, and to employ said evaluation means for monitoring said status condition for transmission in both directions over said route.

10. The optical monitoring system of claim 1 for use with a plurality of routes over which the same signals are simultaneously transmitted at each of a plurality of wave lengths, said system constructed to detect and compare with a respective standard on a continuous basis said value representing the performance quality for at least one selected single wave length travelling in each of said routes and to signal an unacceptable status condition if it occurs on the respective route.

11. The optical monitoring system of claim 3 for use with a plurality of routes over which the same signals are simultaneously transmitted at each of a plurality of wave lengths, said system constructed to detect and compare with a respective standard on a continuous basis said value representing the performance quality for at least one selected single wave length travelling in each of said routes and to signal an unacceptable status condition of the respective route, said system including switch means for switching the signal travelling over the route having unacceptable status condition to a second route having acceptable status condition.

12. The monitoring system of claim 10 or 11 in which signals are transmitted bidirectionally over each of said routes, the system constructed to detect and compare the respective standard with said value representing the performance quality for at least one selected single wave length travelling in only one direction over each of said routes, and to employ said evaluation means for comparing and monitoring said status condition for transmission in both directions over said routes.

13. The optical monitoring system of claim 10 or 11 constructed in accordance with claim 2, said system constructed to detect and compare said value representing the performance quality of each wave length in said set travelling in one direction over said route, and to employ said evaluation means for monitoring said status condition for transmission at each of said wave lengths in both directions over said route.

14. The optical monitoring system of claim 3 or 11 for use with receiving telecommunications equipment which monitors the accuracy of communication of signals at each wave length, said switch means constructed to switch to another route in response to deficient communication as determined and fed back by said receiving telecommunications equipment.

15. The optical monitoring system of claim 1 or 3 constructed to monitor a plurality of bidirectional optical communication routes over each of which signals of at least two wave lengths are simultaneously transmitted, and while each receiver receives its respective wave length from only one of said routes, said monitoring system constructed to indicate the status of each route by comparing said value representing the performance quality to said standard representing the lower limit of acceptable performance on said route, to enable switching of the respective receiver to the route of better quality.

16. The optical monitoring system of claim 15 for use with receiving telecommunication equipment which monitors the accuracy of communication of signals at each wave length further including switch means constructed to switch to another route in response to deficient communication as determined by said receiving telecommunications equipment and fed back to said switch means.

17. An optical monitoring system for an optical communication route in which optical communication signals are transmitted bidirectionally over said route, said monitoring system comprising:

means for tapping from said route a portion of the optical communication signal after it has travelled in one direction over said route, the remainder of said signal being unaffected and proceeding as an optical signal, an optical detector for detecting said tapped portion of signal and for providing a value representing the performance quality of the route for that signal, evaluation means for comparing said value representing the performance quality to a standard representing the lower limit of acceptable performance quality for said signal to evaluate the status condition of said route, and signal means automatically responsive to said evaluation means to signal an unacceptable status condition of said route for transmission in both directions over said route.

18. The optical monitoring system of claim 17 wherein said communication route is constructed to carry a plurality of wave lengths at least in one direction.

19. The optical monitoring system of claim 18 wherein said communication route is constructed to carry a plurality of wave lengths in both directions.

20. The optical monitoring system of claim 18 or 19 further comprising an optical demultiplexer for demultiplexing the tapped signal into constituent optical wave lengths wherein the longest wave length travelling over said route is monitored to determine the status of said route for all wave lengths being transmitted therealong.

21. The optical monitoring system of claim 17 for use with a plurality of routes over which the same signals are simultaneously transmitted bidirectionally, said system constructed to detect and compare with a respective standard said value representing the performance quality of a signal travelling in one direction in each of said routes and to signal using said signal means unacceptable status condition for bidirectional communication over the respective routes.

22. The optical monitoring system of claim 17, 18, 19, 20 or 21 in combination with a switch means for switching to a second route bidirectional transmissions that have travelled over a route having an unacceptable status condition.

23. A route-protected communication system incorporating the monitoring system of claim 22 connected to a plurality of bidirectional routes.

24. The optical monitoring system of claim 3 wherein, upon determining unacceptable status condition with respect to one wave length of said set of signals, said switch means are arranged to switch signals at all wave lengths of said set from said route having an unacceptable status condition to said second route.

25. The optical monitoring system of claim 2 in combination with a switch means for switching to a second route when an unacceptable status condition has been determined, and wherein, upon determining unacceptable status condition with respect to any wave length of said set of signals, said switch means are arranged to switch signals at all wave lengths of said set from said route having an unacceptable status condition to said second route.

* * * * *